United States Patent
Li et al.

(10) Patent No.: US 9,484,965 B2
(45) Date of Patent: Nov. 1, 2016

(54) TERMINAL AND METHOD FOR MAKING TOUCHSCREEN OF TERMINAL

(71) Applicant: Huawei Device Co., Ltd., Shenzhen (CN)

(72) Inventors: Hui Li, Beijing (CN); Anmin Xu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 339 days.

(21) Appl. No.: 14/141,712

(22) Filed: Dec. 27, 2013

(65) Prior Publication Data
US 2014/0113579 A1 Apr. 24, 2014

Related U.S. Application Data

(63) Continuation of application No. PCT/CN2011/076783, filed on Jul. 1, 2011.

(51) Int. Cl.
| | |
|---|---|
| H04B 1/06 | (2006.01) |
| H04B 1/08 | (2006.01) |
| G06F 3/041 | (2006.01) |
| G06F 1/16 | (2006.01) |
| H01Q 1/44 | (2006.01) |

(52) U.S. Cl.
CPC ............. *H04B 1/086* (2013.01); *G06F 1/1605* (2013.01); *G06F 1/1698* (2013.01); *G06F 3/041* (2013.01); *H01Q 1/44* (2013.01)

(58) Field of Classification Search
None
See application file for complete search history.

(56) References Cited

U.S. PATENT DOCUMENTS

| | | | |
|---|---|---|---|
| 9,246,214 B2 * | 1/2016 | Pope | ........................ H01Q 1/243 |
| 2009/0122026 A1 * | 5/2009 | Oh | ......................... G06F 1/1613 |
| | | | 345/174 |
| 2010/0123632 A1 * | 5/2010 | Hill | ......................... H01Q 1/243 |
| | | | 343/702 |
| 2010/0231460 A1 * | 9/2010 | Chiang | ................ H01Q 1/2258 |
| | | | 343/702 |

(Continued)

FOREIGN PATENT DOCUMENTS

| | | |
|---|---|---|
| CN | 101620493 A | 1/2010 |
| CN | 201698380 U | 1/2011 |

(Continued)

OTHER PUBLICATIONS

Partial English Translation and Abstract of Chinese Patent Application No. CN201698380U, May 29, 2013, 11 pages.

(Continued)

*Primary Examiner* — Lana N Le

(74) *Attorney, Agent, or Firm* — Conley Rose, P.C.; Grant Rodolph; Nicholas K. Beaulieu

(57) ABSTRACT

A terminal and a method for making a touchscreen of the terminal, relate to the field of communications technologies and are invented for improving flexibility for receiving an frequency modulation (FM) broadcast. A terminal includes: a touchscreen; where the touchscreen includes a basal layer, a first conductive layer, a second conductive layer, and a touch layer, an antenna layer, and a separation layer, where the antenna layer is configured to dispose a FM antenna; the antenna layer and the separation layer are disposed between the basal layer and the first conductive layer or disposed between the second conductive layer and the touch layer, and the antenna layer is separated from the first conductive layer or the second conductive layer by using the separation layer. The embodiments of the present invention are mainly used in a terminal.

18 Claims, 3 Drawing Sheets

(56) References Cited

U.S. PATENT DOCUMENTS

| | | | |
|---|---|---|---|
| 2011/0050509 A1* | 3/2011 | Ayala Vazquez | H01Q 1/2266 455/575.1 |
| 2011/0241943 A1* | 10/2011 | Shiu | B23K 1/0016 343/700 MS |
| 2012/0256850 A1* | 10/2012 | Hu | H01Q 1/243 345/173 |
| 2013/0168222 A1* | 7/2013 | Ning | H01H 9/0264 200/600 |
| 2014/0065948 A1* | 3/2014 | Huang | H05K 5/0086 455/7 |
| 2016/0064800 A1* | 3/2016 | de Jong | H01Q 1/243 455/575.1 |
| 2016/0093942 A1* | 3/2016 | Konanur | H01Q 1/2266 343/702 |
| 2016/0261023 A1* | 9/2016 | Di Nallo | H01Q 1/24 |

FOREIGN PATENT DOCUMENTS

| | | |
|---|---|---|
| CN | 201773940 U | 3/2011 |
| JP | 2007225644 A | 9/2007 |
| KR | 20080090152 A | 10/2008 |
| KR | 20080113506 A | 12/2008 |

OTHER PUBLICATIONS

Foreign Communication From a Counterpart Application, PCT Application No. PCT/CN2011/076783, English Translation of International Search Report dated Mar. 22, 2012, 3 pages.

Foreign Communication From a Counterpart Application, PCT Application No. PCT/CN2011/076783, English Translation of Written Opinion dated Mar. 22, 2012, 20 pages.

Foreign Communication From a Counterpart Application, Chinese Application No. 201180001366.5, Chinese Office Action dated Oct. 22, 2012, 6 pages.

* cited by examiner

TERMINAL AND METHOD FOR MAKING TOUCHSCREEN OF TERMINAL

CROSS-REFERENCE TO RELATED APPLICATION

This application is a continuation of International Application No. PCT/CN2011/076783, filed on Jul. 1, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

1. Technical Field

The present invention relates to the field of communications technologies, and in particular, to a terminal and a method for making a touchscreen of the terminal.

2. Background

Currently, with the development of communications technologies, most mobile terminals are disposed with an frequency modulation (FM) antenna. Generally, in order to well receive an FM broadcast on a frequency band from tens of megahertz to hundreds of megahertz, the FM antenna needs to be designed with a relatively large size. Therefore, a mobile terminal with an FM function usually takes earphones as the FM antenna.

However, when a user uses the mobile terminal to receive an FM broadcast, the user must carry the earphones. In addition, in order to ensure that the mobile terminal provides a good reception effect, the earphones need to be unfolded or stretched, which leads to bad flexibility for the terminal to receive the FM broadcast by using the FM antenna.

SUMMARY

Embodiments of the present invention provide a terminal and a method for making a touchscreen of the terminal, so as to improve flexibility for a terminal to receive an FM broadcast by using a FM antenna.

The embodiments of the present invention adopt the following technical solutions:

A terminal includes: a touchscreen; where the touchscreen includes: a basal layer, a first conductive layer, a second conductive layer, and a touch layer; and the touchscreen further includes: an antenna layer and a separation layer, where the antenna layer is configured to dispose a FM antenna; the antenna layer and the separation layer are disposed between the basal layer and the first conductive layer or between the second conductive layer and the touch layer; and the antenna layer and the first conductive layer or the second conductive layer are separated by using the separation layer.

Another terminal includes: a touchscreen; where the touchscreen includes: a basal layer, a first conductive layer, a second conductive layer, and a touch layer; and the touchscreen further includes: an antenna layer and a separation layer, where the antenna layer is configured to dispose a FM antenna; the first conductive layer or the second conductive layer is divided into a first area, a second area, and a third area; the antenna layer and the separation layer are disposed in the first area and the second area of the first conductive layer respectively, or the antenna layer and the separation layer are disposed in the first area and the second area of the second conductive layer respectively; and the separation layer in the second area separates the antenna layer in the first area from the third area.

A method for making a touchscreen of a terminal includes: forming a basal layer, a first conductive layer, a second conductive layer, and a touch layer; forming an antenna layer and a separation layer, where the antenna layer is configured to dispose a FM antenna; and disposing the antenna layer and the separation layer between the basal layer and the first conductive layer or between the second conductive layer and the touch layer, and separating the antenna layer from the first conductive layer or the second conductive layer by using the separation layer.

Another method for making a touchscreen of a terminal includes: forming a basal layer, a first conductive layer, a second conductive layer, a touch layer, an antenna layer, and a separation layer; where the antenna layer is configured to dispose a FM antenna; and dividing the first conductive layer or the second conductive layer into a first area, a second area, and a third area, disposing the antenna layer and the separation layer in the first area and the second area of the first conductive layer respectively, or disposing the antenna layer and the separation layer in the first area and the second area of the second conductive layer respectively, and separating, by the separation layer in the second area, the antenna layer in the first area from the third area.

In the terminal and the method for making a touchscreen of the terminal provided by the embodiments of the present invention, a FM antenna is directly disposed on a touchscreen of a terminal, so that when using the FM antenna to receive an FM broadcast, a user does not need to carry earphones and is not limited by an environmental factor such as time and place, thereby improving flexibility for the terminal to receive an FM broadcast by using the FM antenna. Therefore, by adopting the technical solutions in the embodiments of the present invention, flexibility for a terminal to receive an FM broadcast by using a FM antenna is improved.

BRIEF DESCRIPTION OF DRAWINGS

To illustrate the technical solutions in the embodiments of the present invention more clearly, accompanying drawings required for describing the embodiments are briefly introduced in the following. The accompanying drawings in the following description merely show some embodiments of the present invention, and persons of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

To improve user experience of using a terminal, a first embodiment of the present invention provides a terminal, including: a touchscreen. The touchscreen includes a basal layer, a first conductive layer, a second conductive layer, and a touch layer; and the touchscreen further includes an antenna layer and a separation layer, where the antenna layer is configured to dispose a FM antenna. The antenna layer may be made of a material same as that for making a flexible printed circuit (FPC), or may be a metal wire. It should be noted that, when a thickness of the antenna layer is designed, it is necessary to take account of a feature of the touchscreen disposed with the antenna layer. Generally, the antenna layer may be better off by not being designed too thickly.

The antenna layer and the separation layer are disposed between the basal layer and the first conductive layer; or the antenna layer and the separation layer are disposed between the second conductive layer and the touch layer; and the antenna layer is separated from the first conductive layer or the second conductive layer by using the separation layer.

Or, the first conductive layer or the second conductive layer is divided into a first area, a second area, and a third area, where the antenna layer and the separation layer are disposed in the first area and the second area of the first conductive layer or the second conductive layer respectively, and the separation layer in the second area separates the antenna layer in the first area from the third area.

In this embodiment, the terminal may be a phone, a personal digital assistant (PDA), and a tablet, and so on.

It may be seen from the foregoing description that, a FM antenna is directly disposed on a touchscreen of a terminal, so that when using the FM antenna to receive an FM broadcast, a user does not need to carry earphones and is not limited by an environmental factor such as time and place, thereby improving flexibility for the terminal to receive an FM broadcast by using the FM antenna, and further enhancing user experience of using the terminal. Therefore, by adopting the terminal in the embodiment of the present invention, flexibility for a terminal to receive an FM broadcast by using a FM antenna is improved.

Specifically, according to a difference in positions where the antenna layer and the separation layer are disposed, the touchscreen of the terminal may include the following several different structures.

Figure 1:
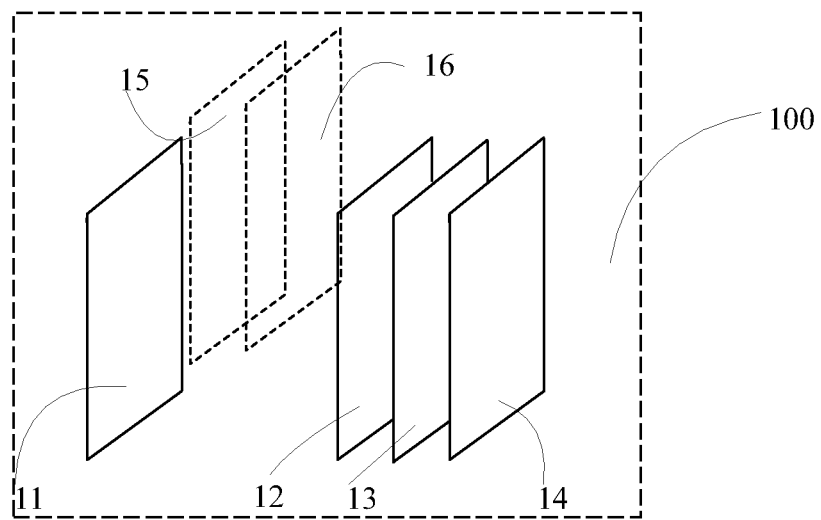
FIG. 1 is a schematic structural diagram of a terminal touchscreen according to a first embodiment of the present invention.

Manner 1: As shown in FIG. 1, a touchscreen of a terminal 100 includes: a basal layer 11, a first conductive layer 12, a second conductive layer 13, a touch layer 14, an antenna layer 15, and a separation layer 16. The antenna layer 15 and the separation layer 16 are disposed between the basal layer 11 and the first conductive layer 12. In this case, the basal layer 11, the first conductive layer 12, the second conductive layer 13, the touch layer 14, the antenna layer 15, and the separation layer 16 are disposed according to a sequence as follows: the basal layer 11, the antenna layer 15, the separation layer 16, the first conductive layer 12, the second conductive layer 13, and the touch layer 14.

Figure 2:
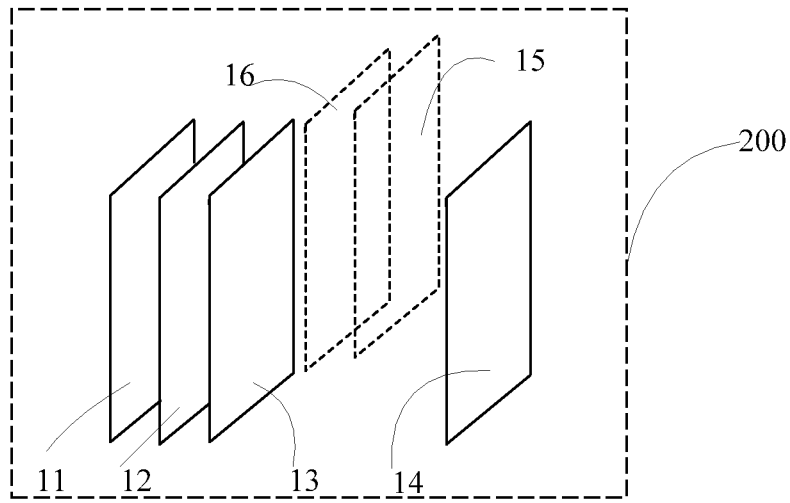
FIG. 2 is another schematic structural diagram of a terminal touchscreen according to the first embodiment of the present invention.

Manner 2: As shown in FIG. 2, a touchscreen of a terminal 200 includes: a basal layer 11, a first conductive layer 12, a second conductive layer 13, a touch layer 14, an antenna layer 15, and a separation layer 16. The antenna layer 15 and the separation layer 16 are disposed between the second conductive layer 13 and the touch layer 14. In this case, the basal layer 11, the first conductive layer 12, the second conductive layer 13, the touch layer 14, the antenna layer 15, and the separation layer 16 are disposed according to a sequence as follows: the basal layer 11, the first conductive layer 12, the second conductive layer 13, the separation layer 16, the antenna layer 15, and the touch layer 14.

Figure 3:
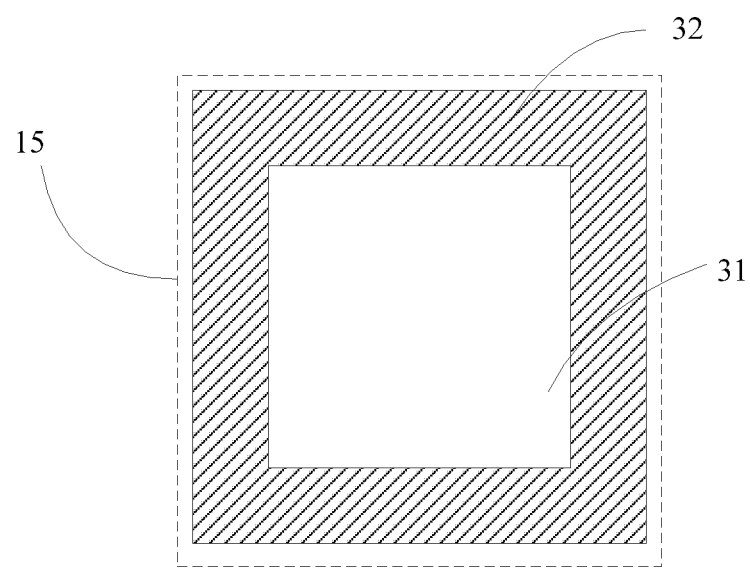
FIG. 3 is schematic structural diagram of an antenna layer of a terminal touchscreen according to the first embodiment of the present invention.

Specifically, as shown in FIG. 3, in the manner 1 or the manner 2, the antenna layer 15 may include a visible area 31 and an invisible area 32. The visible area 31 may be made of glass or plastic with high light transmittance, so that light may transmit through the touchscreen. The invisible area 32 is configured to dispose the FM antenna. Specifically, a groove may be provided in the invisible area 32, and the FM antenna may be disposed in the groove, so that the antenna layer has a smooth surface to closely attach to other layers.

Manner 3: The antenna layer 15 and the separation layer 16 may be disposed in the first conductive layer or the second conductive layer.

Figure 4:
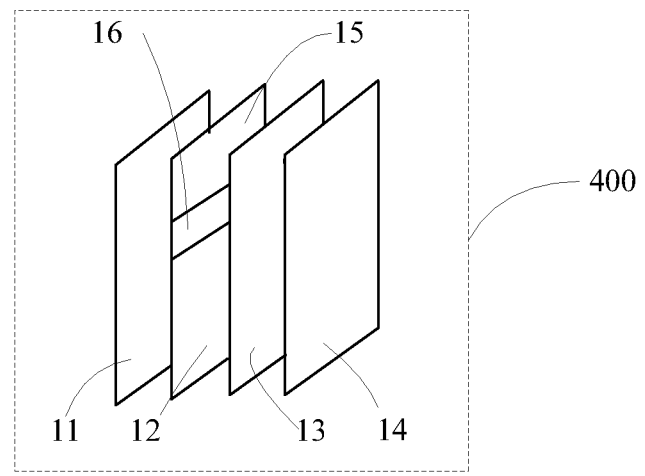
FIG. 4 is another schematic structural diagram of a terminal touchscreen according to the first embodiment of the present invention.

That the antenna layer and the separation layer are disposed in the first conductive layer is taken as an example. As shown in FIG. 4, a touchscreen of a terminal 400 includes: a basal layer 11, a first conductive layer 12, a second conductive layer 13, a touch layer 14, an antenna layer 15, and a separation layer 16. The antenna layer 15 and the separation layer 16 are disposed in the first conductive layer 12.

Figure 5:
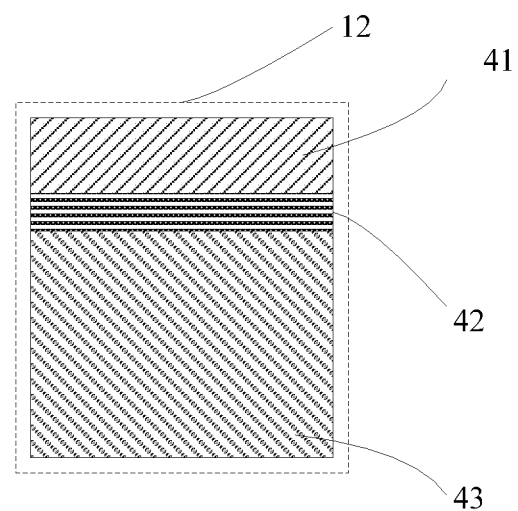
FIG. 5 is a schematic structural diagram of a first conductive layer of a terminal touchscreen according to the first embodiment of the present invention.

Specifically, as shown in FIG. 5, the first conductive layer 12 is divided into a first area 41, a second area 42, and a third area 43. The antenna layer 15 and the separation layer 16 are disposed in the first area 41 and the second area 42 of the first conductive layer 12 respectively, and the separation layer 16 in the second area 42 separates the antenna layer 15 in the first area 41 from the third area 43. The first area 41, the second area 42, and the third area 43 do not specifically refer to a certain area of the first conductive layer 12. It is only required that an area where a separation layer 16 is disposed can separate an area where an antenna layer 15 is disposed from a remaining area of the first conductive layer 12.

In the manner 3, the first conductive layer 12 is still taken as an example for description. Referring to FIG. 5, the third area 43 may be set to a visible area 31, and the first area 41 and the second area 42 are set to an invisible area 32. Similarly, a groove may be provided in the third area 43 of the invisible area 32 of the first conductive layer 12, and the FM antenna may be disposed in the groove, so that the first conductive layer 12 has a smooth surface to closely attach to other layers.

In addition, in the manner 3, when the antenna layer 15 and the separation layer 16 are disposed in the first conductive layer 12 or the second conductive layer 13, the touchscreen is thinner, but an area for sensing a touch operation of a user becomes smaller. For example, in FIG. 5, an area of the third area 43 is smaller than that of the first conductive layer 12.

A second embodiment of the present invention provides a method for making a touchscreen of a terminal, where the method includes: successively forming a basal layer 11, a first conductive layer 12, a second conductive layer 13, and a touch layer 14; forming an antenna layer 15 and a separation layer 16, where the antenna layer 15 is configured to dispose a FM antenna; and disposing the antenna layer 15 and the separation layer 16 between the basal layer 11 and the first conductive layer 12 or between the second conductive layer 13 and the touch layer 14, and separating the antenna layer 15 from the first conductive layer 12 or the second conductive layer 13 by using the separation layer 16; or, dividing the first conductive layer 12 or the second conductive layer 13 into a first area 41, a second area 42, and a third area 43, and disposing the antenna layer 15 and the separation layer 16 in the first area 41 and the second area 42 of the first conductive layer 12 or the second conductive layer 13, respectively, and separating, by the separation layer 16 in the second area 42, the antenna layer 15 in the first area 41 from the third area 43.

In this embodiment, the antenna layer 15 and the separation layer 16 may be attached between the basal layer 11 and the first conductive layer 12, and the separation layer 16 is configured to separate the antenna layer 15 from the first conductive layer 12. In this case, referring to FIG. 1, the basal layer 11, the first conductive layer 12, the second conductive layer 13, the touch layer 14, the antenna layer 15, and the separation layer 16 are disposed according to a sequence as follows: the basal layer, the antenna layer, the separation layer, the first conductive layer, the second conductive layer, and the touch layer.

Or, the antenna layer 15 and the separation layer 16 may be attached between the second conductive layer 13 and the touch layer 14, and the separation layer 16 is configured to separate the second conductive layer 13 from the antenna layer 15. In this case, referring to FIG. 2, the basal layer 11, the first conductive layer 12, the second conductive layer 13, the touch layer 14, the antenna layer 15, and the separation layer 16 are disposed according to a sequence as follows: the basal layer, the first conductive layer, the second conductive layer, the separation layer, the antenna layer, and the touch layer.

Referring to FIG. 3, when the antenna layer and the separation layer are disposed between the basal layer and the first conductive layer, or disposed between the second conductive layer and the touch layer, the antenna layer 15 may be divided into a visible area 31 and an invisible area 32. The visible area 31 may be made of glass or plastic with high light transmittance, so that light may transmit through the touchscreen. The invisible area 32 is configured to dispose the FM antenna. Specifically, a groove may be provided in the invisible area 32, and the FM antenna may be disposed in the groove, so that the antenna layer has a smooth surface to closely attach to other layers.

Or, the antenna layer and the separation layer may be disposed in the first conductive layer or the second conductive layer. For example, referring to FIG. 5, the first conductive layer is divided into a first area, a second area, and a third area. The antenna layer and the separation layer are disposed in the first area and the second area of the first conductive layer respectively, and the separation layer in the second area separates the antenna layer in the first area form the third area.

When the antenna layer and the separation layer are disposed in the first conductive layer or the second conductive layer, the first conductive layer 12 is still taken as an example for description. Referring to FIG. 5, an area where the third area 43 is located may be taken as a visible area, and an area where the first area 41 and the second area 42 are located may be taken as an invisible area. Similarly, a groove may be provided in the third area 43 of the invisible area of the first conductive layer 12, and the FM antenna may be disposed in the groove, so that the first conductive layer 12 has a smooth surface to closely attach to other layers.

It may be seen from the foregoing description that, a FM antenna is directly disposed on a touchscreen of a terminal, so that when using the FM antenna to receive an FM broadcast, a user does not need to carry earphones and is not limited by an environmental factor such as time and place, thereby improving flexibility for the terminal to receive an FM broadcast by using the FM antenna, and further enhancing user experience of using the terminal. Therefore, by adopting the technical solutions in the embodiments of the present invention, flexibility for a terminal to receive an FM broadcast by using a FM antenna is improved.

To sum up, by adopting the technical solutions in the embodiments of the present invention, flexibility for a terminal to receive an FM broadcast by using a FM antenna is improved.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A terminal, comprising:
   a touchscreen,
   wherein the touchscreen comprises:
      a basal layer;
      a first conductive layer;
      a second conductive layer;
      a touch layer;
      an antenna layer; and
      a separation layer,
   wherein the antenna layer is configured to dispose a frequency modulation (FM) antenna,
   wherein the antenna layer comprises an inner portion and an outer portion,
   wherein the inner portion of the antenna layer is visible and is made of a material with high light transmittance that is configured to transmit light through the touchscreen,
   wherein the outer portion of the antenna layer is invisible and comprises a groove,
   wherein the FM antenna is disposed in the groove of the outer portion of the antenna layer,
   wherein the separation layer is configured to separate the antenna layer from either the first conductive layer or the second conductive layer, and
   wherein the antenna layer and the separation layer are either disposed between the basal layer and the first conductive layer or disposed between the second conductive layer and the touch layer.

2. The terminal according to claim 1, wherein when the antenna layer and the separation layer are disposed between the basal layer and the first conductive layer, the basal layer, the first conductive layer, the second conductive layer, the touch layer, the antenna layer, and the separation layer are disposed according to a sequence as follows: the basal layer, the antenna layer, the separation layer, the first conductive layer, the second conductive layer, and the touch layer.

3. The terminal according to claim 1, wherein when the antenna layer and the separation layer are disposed between the touch layer and the second conductive layer, the basal layer, the first conductive layer, the second conductive layer, the touch layer, the antenna layer, and the separation layer are disposed according to a sequence as follows: the basal layer, the first conductive layer, the second conductive layer, the separation layer, the antenna layer, and the touch layer.

4. The terminal according to claim 1, wherein the separation layer is configured to separate the antenna layer from the first conductive layer, and wherein the antenna layer and the separation layer are disposed between the basal layer and the first conductive layer.

5. The terminal according to claim 1, wherein the separation layer is configured to separate the antenna layer from the second conductive layer, and wherein the antenna layer and the separation layer are disposed between the second conductive layer and the touch layer.

6. The terminal according to claim 1, wherein the material with high light transmittance comprises glass.

7. The terminal according to claim 1, wherein the material with high light transmittance comprises plastic.

8. The terminal according to claim 1, wherein the antenna layer is made of a flexible printed circuit material.

9. The terminal according to claim 1, wherein the antenna layer is made of a metal wire.

10. The terminal according to claim 1, wherein the inner portion of the antenna layer has a rectangular shape, wherein the outer portion of the antenna layer surrounds the inner portion of the antenna layer and has a rectangular outer boundary and a rectangular inner boundary.

11. A method for making a touchscreen of a terminal, comprising:
    forming a basal layer, a first conductive layer, a second conductive layer, and a touch layer;
    forming an antenna layer and a separation layer, wherein the antenna layer is configured to dispose a frequency modulation (FM) antenna, wherein the antenna layer comprises an inner portion and an outer portion, wherein the inner portion of the antenna layer is visible and is made of a material with high light transmittance that is configured to transmit light through the touchscreen, wherein the outer portion of the antenna layer is invisible and comprises a groove, wherein the FM antenna is disposed in the groove of the outer portion of the antenna layer, wherein the separation layer is configured to separate the antenna layer from either the first conductive layer or the second conductive layer; and
    disposing the antenna layer and the separation layer either between the basal ayer and the first conductive layer or between the second conductive layer and the touch layer.

12. The method according to claim 11, wherein disposing the antenna layer and the separation layer either between the basal layer and the first conductive layer or between the second conductive layer and the touch layer comprises attaching the antenna layer and the separation layer between the basal layer and the first conductive layer, wherein the separation layer is configured to separate the antenna layer from the first conductive layer, and wherein the basal layer, the first conductive layer, the second conductive layer, the touch layer, the antenna layer, and the separation layer are attached according to a sequence as follows: the basal layer, the antenna layer, the separation layer, the first conductive layer, the second conductive layer, and the touch layer.

13. The method according to claim 11, wherein disposing the antenna layer and the separation layer either between the basal layer and the first conductive layer or between the second conductive layer and the touch layer comprises attaching the antenna layer and the separation layer between the second conductive layer and the touch layer, wherein the separation layer is configured to separate the second conductive layer from the antenna layer, and wherein the antenna layer and the separation layer are disposed between the touch layer and the second conductive layer, and the basal layer, the first conductive layer, the second conductive layer, the touch layer, the antenna layer, and the separation layer are attached according to a sequence as follows: the basal layer, the first conductive layer, the second conductive layer, the separation layer, the antenna layer, and the touch layer.

14. The method according to claim 11, wherein the material with high light transmittance comprises glass.

15. The method according to claim 11, wherein the material with high light transmittance comprises plastic.

16. The method according to claim 11, wherein the antenna layer is made of a flexible printed circuit material.

17. The method according to claim 11, wherein the antenna layer is made of a metal wire.

18. The method according to claim 11, wherein the inner portion of the antenna layer has a rectangular shape, wherein the outer portion of the antenna layer surrounds the inner portion of the antenna layer and has a rectangular outer boundary and a rectangular inner boundary.

* * * * *